(12) United States Patent
Nakao et al.

(10) Patent No.: US 9,462,244 B2
(45) Date of Patent: Oct. 4, 2016

(54) IMAGE DISPLAY APPARATUS AND OPTICAL COMPONENT

(71) Applicant: Funai Electric Co., Ltd., Osaka (JP)

(72) Inventors: Yoshizumi Nakao, Osaka (JP); Seiji Takemoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 15/000,682

(22) Filed: Jan. 19, 2016

(65) Prior Publication Data
US 2016/0134850 A1 May 12, 2016

Related U.S. Application Data

(63) Continuation of application No. 14/030,463, filed on Sep. 18, 2013, now abandoned.

(30) Foreign Application Priority Data

Sep. 19, 2012 (JP) ................................. 2012-205896
Aug. 9, 2013 (JP) ................................. 2013-166850

(51) Int. Cl.
| | |
|---|---|
| G03B 21/14 | (2006.01) |
| H04N 9/31 | (2006.01) |
| G02B 26/08 | (2006.01) |
| G02B 27/14 | (2006.01) |
| G03B 21/20 | (2006.01) |

(52) U.S. Cl.
CPC ........ *H04N 9/3182* (2013.01); *G02B 26/0833* (2013.01); *G02B 27/141* (2013.01); *G03B 21/2033* (2013.01); *H04N 9/3129* (2013.01); *H04N 9/3135* (2013.01); *H04N 9/3155* (2013.01); *H04N 9/3161* (2013.01); *H04N 9/3194* (2013.01)

(58) Field of Classification Search
CPC .............. G03B 21/20; G03B 21/2033; H04N 9/3182; H04N 9/3194; H04N 9/3155; H04N 9/3164; H04N 9/3161; H04N 9/3129; H04N 9/3158; H04N 9/3154; G09G 3/3413; G02B 27/10; G02B 27/1006; G02B 27/1013; G02B 27/104
USPC .......... 353/31, 33, 34, 37; 359/204.1, 204.4, 359/629, 634
See application file for complete search history.

(56) References Cited

U.S. PATENT DOCUMENTS

| | | |
|---|---|---|
| 4,843,610 A | 6/1989 | Okada et al. |
| 7,959,303 B2 | 6/2011 | Nishioka et al. |

(Continued)

FOREIGN PATENT DOCUMENTS

| | | |
|---|---|---|
| JP | 63-293990 B2 | 11/1988 |
| JP | 2004-226631 A | 8/2004 |
| JP | 2008-003270 A | 1/2008 |

*Primary Examiner* — William C Dowling
(74) *Attorney, Agent, or Firm* — Baker & Hostetler LLP

(57) ABSTRACT

This image display apparatus includes laser beam source portions, a synthesized beam generation portion, a control portion, a branching unit, and a detection portion, while the branching unit has a reflectance or transmittance with increase/decrease characteristics opposite to increase/decrease characteristics of the outputs of laser beams in increasing or decreasing the outputs of the laser beams of color components according to changes of the wavelengths of the laser beams of the color components in order to maintain the prescribed color state of a synthesized beam.

20 Claims, 5 Drawing Sheets

(56) References Cited

U.S. PATENT DOCUMENTS

| | | |
|---|---|---|
| 8,123,367 B2 | 2/2012 | Nagashima et al. |
| 8,182,093 B2 | 5/2012 | Kurozuka et al. |
| 2007/0138372 A1 | 6/2007 | Klosowiak et al. |
| 2011/0279494 A1 | 11/2011 | Drumm et al. |
| 2012/0032875 A1 | 2/2012 | Sprowl et al. |
| 2014/0078121 A1 | 3/2014 | Chikaoka |

(a)
CHARACTERISTICS AT 25°C

|  | R | G | B |
|---|---|---|---|
| WAVELENGTH [nm] | 638 | 515 | 450 |
| LASER OUTPUT [mW] | P | 0.76P | 0.55P |

CHROMATICITY VALUES (x, y) = (0.31, 0.316)

(b)
CHARACTERISTICS AT 50°C

|  | R | G | B |
|---|---|---|---|
| WAVELENGTH [nm] | 643 | 517 | 452 |
| LASER OUTPUT [mW] | P | 0.76P | 0.55P |

CHROMATICITY VALUES (x, y) = (0.284, 0.33)

(c)
CHARACTERISTICS FOR MAINTAINING WHITE BALANCE AND BRIGHTNESS AT 50°C

|  | R | G | B |
|---|---|---|---|
| WAVELENGTH [nm] | 643 | 517 | 452 |
| LASER OUTPUT [mW] | 1.21P | 0.72P | 0.56P |

CHROMATICITY VALUES (x, y) = (0.31, 0.316)

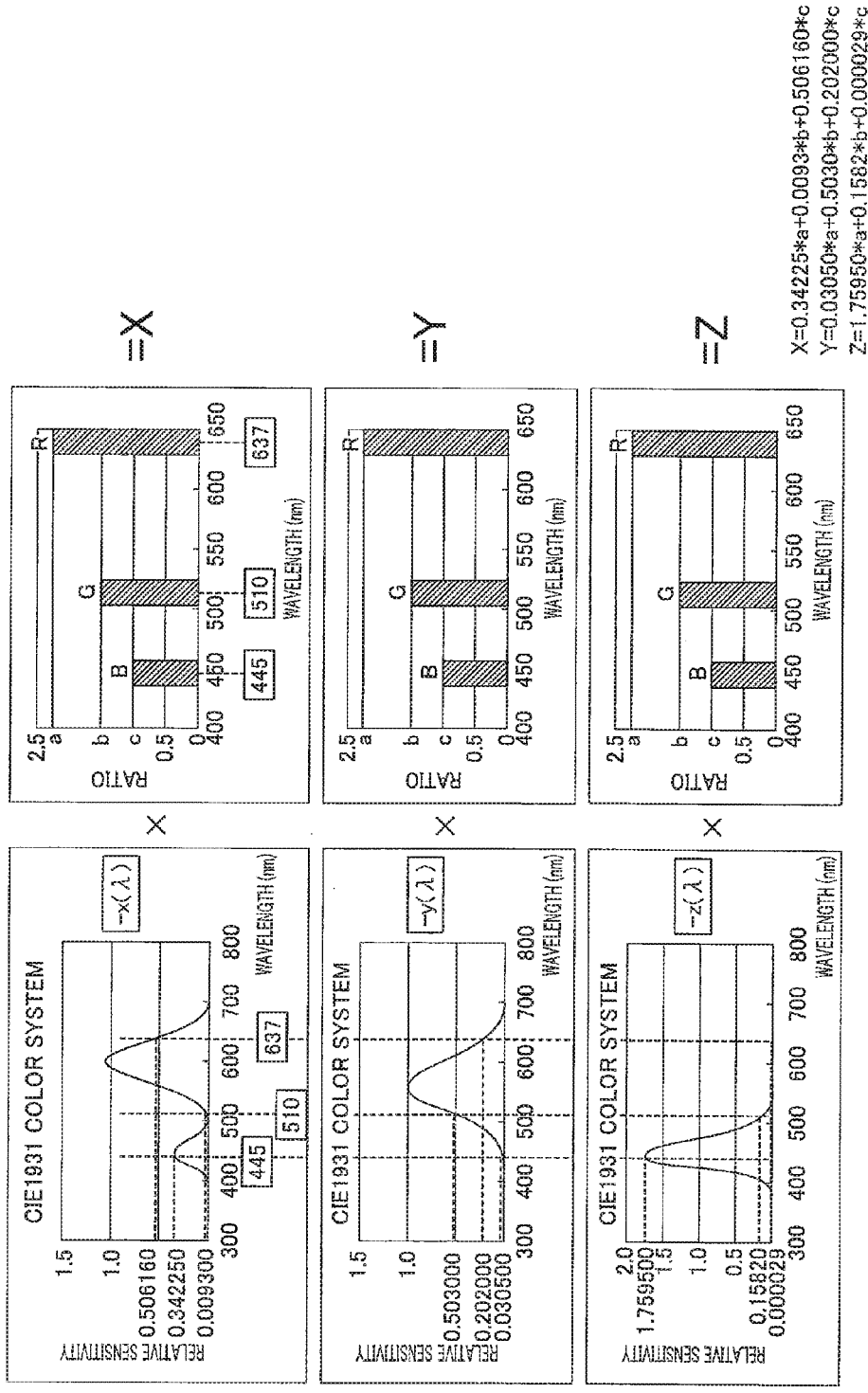

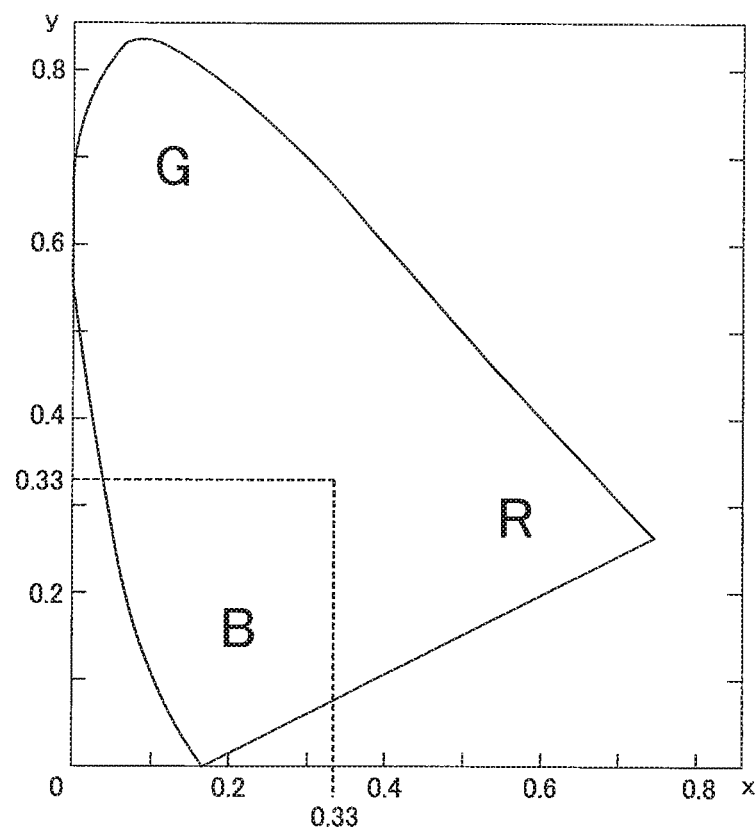

IMAGE DISPLAY APPARATUS AND OPTICAL COMPONENT

CROSS-REFERENCE TO RELATED APPLICATIONS

The present application claims the benefit of and is a continuation application of U.S. patent application Ser. No. 14/030,463, filed on Sep. 18, 2013, which claims the benefit of Japanese Application Serial No. 2012-205896, with a filing date of Sep. 19, 2012 and claims the benefit of Japanese Application Series No. 2013-166850, with a filing date of Aug. 9, 2013.

BACKGROUND OF THE INVENTION

1. Field of the Invention

The present invention relates to an image display apparatus synthesizing a plurality of laser beams of different color components to project a color image and an optical component utilized in such an image display apparatus, exhibiting a prescribed reflectance or transmittance for a laser beam of a prescribed wavelength.

2. Description of the Background Art

Various image display apparatuses, such as a laser projector, each synthesizing laser beams of a red color component (R), a green color component (G), and a blue color component (B) to project and display a color image on a projection surface are put to practical use. Such an image display apparatus must maintain the color state of a beam obtained by synthesizing laser beams of R, G, and B in a prescribed state in order to project and display a color image with high color reproducibility. Typically, the white balance of the beam obtained by synthesizing the laser beams of R, G, and B must be created.

Japanese Patent Laying-Open No. 2004-226631 discloses a projector including a first light source portion, a second light source portion, a third light source portion, a temperature detection portion detecting the temperature of each light source portion, a spatial light modulator modulating light from each light source portion according to an image signal, a projection lens projecting the light modulated by the spatial light modulator on a screen, a storage portion storing a relationship between the temperature of each light source portion and a luminance distribution of each color light from each light source portion, and a control portion controlling the spatial light modulator to substantially uniform the luminance distributions of the color light on the screen on the basis of the relationship between the temperature of each light source portion detected by each temperature detection portion and the luminance distribution of each color light stored in the storage portion in order to reduce irregular colors correspondingly to a change of irregular color distribution following a change of the temperature of each light source portion.

Japanese Patent Laying-Open No. 2008-003270 discloses the structure of a projection image display apparatus partially emitting a beam combined into a white beam to a light detection portion, allowing the beam to be incident on a photo sensor having a color filter mounted on a photodiode, comparing a signal indicating the light quantity of the beam output from the photo sensor with a signal value in previous adjustment of a white balance by changes of the light quantities of R, G, and B in a control portion, and changing the drive gain of each light source in order to reduce a difference between the light quantities to adjust the chromaticity of white.

Japanese Patent No. 2663437 discloses a semiconductor laser apparatus configured to reduce a fluctuation in the intensity of output light resulting from a temperature change by rendering the temperature-dependent characteristics of the intensity of monitor light emitted from a semiconductor laser element and the temperature-dependent characteristics of the detection output of a light receiving element opposite to each other. In this semiconductor laser apparatus, no control for achieving a prescribed color state such as a white balance correspondingly to a wavelength change is performed.

As described above, in the image display apparatus projecting the color image, it is necessary to create the white balance, but a change of the output light quantity of each light source and a change of the output wavelength of each light source cause loss of this white balance. In other words, a state where the white balance is created denotes a state where the light quantity (namely, the output of each light source) thereof is a prescribed value with respect to the wavelength of the beam of each color component forming a synthesized beam, and when the wavelength of the output of each light source changes, the white balance is lost unless each light source outputs a prescribed light quantity with the changed wavelength.

In the image display apparatus, an element such as an LD (a laser diode) is employed as a laser beam source for each color component, but the wavelength of an output laser beam changes due to a temperature change. On the other hand, the image display apparatus is employed in various environments and is provided with a component generating heat by operation in addition to the laser beam source, so that the temperature of the laser beam source changes and the wavelength of the laser beam output therefrom changes. In the case where the white balance is adjusted on the basis of the light quantity (the luminance) of the laser beam, the white balance of a synthesized laser beam is disadvantageously lost when the wavelength of the laser beam changes.

SUMMARY OF THE INVENTION

The present invention has been proposed in order to solve the aforementioned problem, and an object of the present invention is to maintain a prescribed color state such as a white balance even when the wavelength of a laser beam changes.

An image display apparatus according to a first aspect of the present invention includes a plurality of laser beam source portions outputting laser beams of a plurality of color components different from each other, a synthesized beam generation portion synthesizing the laser beams of the plurality of color components to generate a synthesized beam, a control portion controlling the outputs of the laser beam source portions, a branching unit branching the laser beams of the color components, and a detection portion detecting the light quantities of the laser beams of the color components branched by the branching unit, while the branching unit has a reflectance or transmittance with increase/decrease characteristics opposite to the increase/decrease characteristics of the outputs of the laser beams in increasing or decreasing the outputs of the laser beams of the color components according to changes of the wavelengths of the laser beams of the color components in order to maintain the prescribed color state of the synthesized beam, and the control portion is configured to control the outputs of the laser beam source portions according to the light quantities of branched laser beams of the color components detected by the detection portion.

As hereinabove described, the image display apparatus according to the first aspect is provided with the branching unit having the reflectance or transmittance with the increase/decrease characteristics opposite to the increase/decrease characteristics of the outputs of the laser beams in increasing or decreasing the outputs of the laser beams of the color components according to the changes of the wavelengths of the laser beams of the color components in order to maintain the prescribed color state of the synthesized beam, whereby even when the wavelengths of the laser beams change, the outputs of the laser beam source portions are controlled according to the light quantities of the laser beams of the color components branched by the branching unit and detected by the detection portion, so that the prescribed color state such as a white balance can be maintained.

In the aforementioned image display apparatus according to the first aspect, the control portion is preferably configured to decrease the outputs of the laser beam source portions for the color components whose detected light quantities are increased and increase the outputs of the laser beam source portions for the color components whose detected light quantities are decreased according to the light quantities of the branched laser beams of the color components detected by the detection portion. According to this structure, the outputs of the laser beam source portions are adjusted in such directions as to cancel the changes of the detected light quantities, whereby the prescribed color state can be easily maintained.

In the aforementioned image display apparatus according to the first aspect, the control portion is preferably configured to increase the outputs of a blue laser beam source outputting a laser beam of a blue color component and a red laser beam source outputting a laser beam of a red color component and decrease the output of a green laser beam source outputting a laser beam of a green color component when the wavelengths of the laser beams of the color components output from the laser beam source portions are increased due to a temperature rise. According to this structure, even when the wavelengths of the laser beams of the color components output from the laser beam source portions are increased due to a temperature rise, the prescribed color state can be easily maintained by increasing the outputs of the laser beam source of the blue color component and the laser beam source of the red color component and decreasing the output of the laser beam source of the green color component.

In the aforementioned image display apparatus according to the first aspect, the branching unit is preferably so configured that the reflectance or transmittance thereof changes according to the changes of the wavelengths of the laser beams. According to this structure, the changes of the wavelengths of the laser beams can be easily detected by the changes of the light quantities of the laser beams of the color components branched by the branching unit.

In this case, the branching unit is preferably so configured that the reflectance or transmittance thereof decreases when the wavelengths of the laser beam of the blue color component and the laser beam of the red color component are increased and increases when the wavelength of the laser beam of the green color component is increased. According to this structure, the changes of the wavelengths of the laser beams of the blue, red, and green color components are easily detected and the outputs of the laser beam source portions for the blue, red, and green color components are adjusted by the control portion, whereby the prescribed color state can be easily maintained.

In the aforementioned image display apparatus according to the first aspect, the branching unit is preferably so configured that the reflectance or transmittance thereof for the laser beam of the blue color component is highest, the reflectance or transmittance thereof for the laser beam of the red color component is lowest, and the reflectance or transmittance thereof for the laser beam of the green color component is between the reflectance or transmittance thereof for the laser beam of the blue color component and the reflectance or transmittance thereof for the laser beam of the red color component. According to this structure, the light quantity of the laser beam of the blue color component whose wavelength is short and for which the detection sensitivity is low, being incident on the detection portion is increased, and the light quantity of the laser beam of the red color component whose wavelength is long and for which the detection sensitivity is high, being incident on the detection portion is decreased. Therefore, the detection portion can reliably detect the laser beams of the red color component, the green color component, and the blue color component without increasing the range of the detection sensitivity of the detection portion for the laser beams.

In the aforementioned image display apparatus according to the first aspect, the prescribed color state preferably includes a state where the white balance of the synthesized beam is created. According to this structure, even when the wavelengths of the laser beams change, the state where the white balance is created can be maintained.

In the aforementioned image display apparatus according to the first aspect, the branching unit preferably includes a prism formed with a dielectric multi-layer having a reflectance or transmittance with increase/decrease characteristics opposite to the increase/decrease characteristics of the outputs of the laser beams. According to this structure, due to the dielectric multi-layer, the branching unit having the reflectance or transmittance with the increase/decrease characteristics opposite to the increase/decrease characteristics of the outputs of the laser beams in increasing or decreasing the outputs of the laser beams of the color components according to the changes of the wavelengths of the laser beams of the color components in order to maintain the prescribed color state of the synthesized beam can be easily provided. Furthermore, the branching unit includes the prism formed with the dielectric multi-layer, whereby the branching unit can be employed with the function of the prism in addition to a function of branching the beam.

In the aforementioned image display apparatus according to the first aspect, the branching unit is preferably provided in the optical path of the synthesized beam, and the control portion is preferably configured to allow a laser beam source portion for any one of the color components to output a laser beam during image display with the synthesized beam and control the output of the laser beam source portion according to the light quantity of a branched laser beam of a single color component detected by the detection portion. According to this structure, the branching unit and the detection portion can be shared for the color components, and hence the number of components can be reduced.

In the aforementioned structure having the branching unit provided in the optical path of the synthesized beam, the control portion is preferably configured to allow the plurality of laser beam source portions one by one to sequentially output the laser beams during the image display with the synthesized beam and control the outputs of the laser beam source portions according to the light quantities of the branched laser beams of the color components detected by the detection portion. According to this structure, the laser beams of the color components can be detected individually, and hence the changes of the light quantities of the laser beams of the color components can be more accurately detected.

In the aforementioned structure having the branching unit provided in the optical path of the synthesized beam, the control portion is preferably configured to allow the laser beam source portion for any one of the color components to output the laser beam for detecting the light quantity at an interval of a prescribed number of frames during the image display with the synthesized beam and control the output of the laser beam source portion according to the light quantity of the branched laser beam of the single color component detected by the detection portion. According to this structure, even when the wavelength of the laser beam changes during the image display, the output of the laser beam source portion can be adjusted according to the change of the light quantity detected by the detection portion, and hence the prescribed color state such as the white balance during the image display can be easily maintained.

In the aforementioned structure having the branching unit provided in the optical path of the synthesized beam, the control portion is preferably configured to switch between a first mode in which an image is continuously displayed without detection of the light quantity and a second mode in which the laser beam is output from the laser beam source portion for any one of the color components during the image display with the synthesized beam and the light quantity of the laser beam is detected. According to this structure, the prescribed color state such as the white balance during the image display can be easily maintained by the second mode while the image is continuously smoothly displayed without detection of the light quantity by the first mode.

The aforementioned image display apparatus according to the first aspect preferably further includes a scan portion scanning the synthesized beam, and the branching unit is preferably arranged between the synthesized beam generation portion and the scan portion in the optical path of the synthesized beam. According to this structure, the branching unit can be arranged at a position on which the laser beams of the color components are focused, and hence increase in the size of the branching unit can be inhibited.

In this case, the scan portion preferably includes a MEMS (micro electro mechanical system) scan mirror. According to this structure, with the MEMS scan mirror, downsizing in the scan portion, low power consumption, speeding up of processing, etc. can be achieved.

In the aforementioned image display apparatus according to the first aspect, the synthesized beam generation portion preferably includes a dichroic mirror. According to this structure, with the dichroic mirror, the accuracy of color synthesis can be improved, and the durability of the synthesized beam generation portion can be improved.

An optical component according to a second aspect of the present invention has a reflectance or transmittance with increase/decrease characteristics opposite to increase/decrease characteristics of the outputs of laser beams in increasing or decreasing the outputs of the laser beams of a plurality of color components according to changes of the wavelengths of the laser beams of the color components in order to maintain a synthesized beam obtained by synthesizing the laser beams of the color components in a prescribed color state, is provided in an image display apparatus comprising a detection portion detecting the light quantities of the laser beams and a control portion controlling the outputs of a plurality of laser beam source portions outputting the laser beams of the plurality of color components different from each other according to the detection results of the detection portion, and includes a branching unit branching the laser beams of the color components and guiding the laser beams to the detection portion.

In the optical component according to the second aspect, as hereinabove described, the branching unit is configured to have the reflectance or transmittance with the increase/decrease characteristics opposite to the increase/decrease characteristics of the outputs of the laser beams in increasing or decreasing the outputs of the laser beams of the color components according to the changes of the wavelengths of the laser beams of the color components in order to maintain the prescribed color state of the synthesized beam, whereby even when the wavelengths of the laser beams change, the outputs of the laser beam source portions are controlled according to the light quantities of the laser beams of the color components branched by the branching unit and detected by the detection portion, so that the prescribed color state such as a white balance can be maintained.

In the aforementioned optical component according to the second aspect, the control portion is preferably configured to decrease the outputs of the laser beam source portions for the color components whose detected light quantities are increased and increase the outputs of the laser beam source portions for the color components whose detected light quantities are decreased according to the light quantities of branched laser beams of the color components detected by the detection portion. According to this structure, the outputs of the laser beam source portions are adjusted in such directions as to cancel the changes of the detected light quantities, whereby the prescribed color state can be easily maintained.

In the aforementioned optical component according to the second aspect, the branching unit is preferably so configured that the reflectance or transmittance thereof changes according to the changes of the wavelengths of the laser beams. According to this structure, the changes of the wavelengths of the laser beams can be easily detected by the changes of the light quantities of the laser beams of the color components branched by the branching unit.

In this case, the branching unit is preferably so configured that the reflectance or transmittance thereof decreases when the wavelengths of a laser beam of a blue color component and a laser beam of a red color component are increased and increases when the wavelength of a laser beam of a green color component is increased. According to this structure, the changes of the wavelengths of the laser beams of the blue, red, and green color components are easily detected and the outputs of the laser beam source portions for the blue, red, and green color components are adjusted by the control portion, whereby the prescribed color state can be easily maintained.

In the aforementioned optical component according to the second aspect, the branching unit is preferably so configured that the reflectance or transmittance thereof for the laser beam of the blue color component is highest, the reflectance or transmittance thereof for the laser beam of the red color component is lowest, and the reflectance or transmittance thereof for the laser beam of the green color component is between the reflectance or transmittance thereof for the laser beam of the blue color component and the reflectance or transmittance thereof for the laser beam of the red color component. According to this structure, the light quantity of the laser beam of the blue color component whose wavelength is short and for which the detection sensitivity is low, being incident on the detection portion is increased, and the light quantity of the laser beam of the red color component whose wavelength is long and for which the detection sensitivity is high, being incident on the detection portion is decreased. Therefore, the detection portion can reliably detect the laser beams of the red color component, the green color component, and the blue color component without increasing the range of the detection sensitivity of the detection portion for the laser beams.

The control portion according to the present invention can have a circuit configuration employing an electronic component and also can be configured as a functional module employing computer hardware and software and so configured that the computer hardware executes the software.

According to the present invention, in the image display apparatus, the prescribed color state such as the white balance can be maintained even when the wavelengths of the laser beams change.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 illustrates arithmetic processing according to the embodiment of the present invention; and FIG. 7 is a chromaticity diagram for illustrating the arithmetic processing according to the embodiment of the present invention.

DESCRIPTION OF THE PREFERRED EMBODIMENTS

The present invention is applicable to various image display apparatuses each synthesizing laser beams of different color components output from a plurality of laser beam source portions to display a color image, but as an example of applying the present invention, the structure of a laser projector synthesizing laser beams of three color components of a red color component (R), a green color component (G), and a blue color component (B) and scanning this synthesized beam by a scan mirror to project and display a color image on a projection surface is now described. A state of creating a white balance in the synthesized beam is described as an example, but it is clear from the following description that another prescribed color state can be created according to the present invention.

Figure 1:
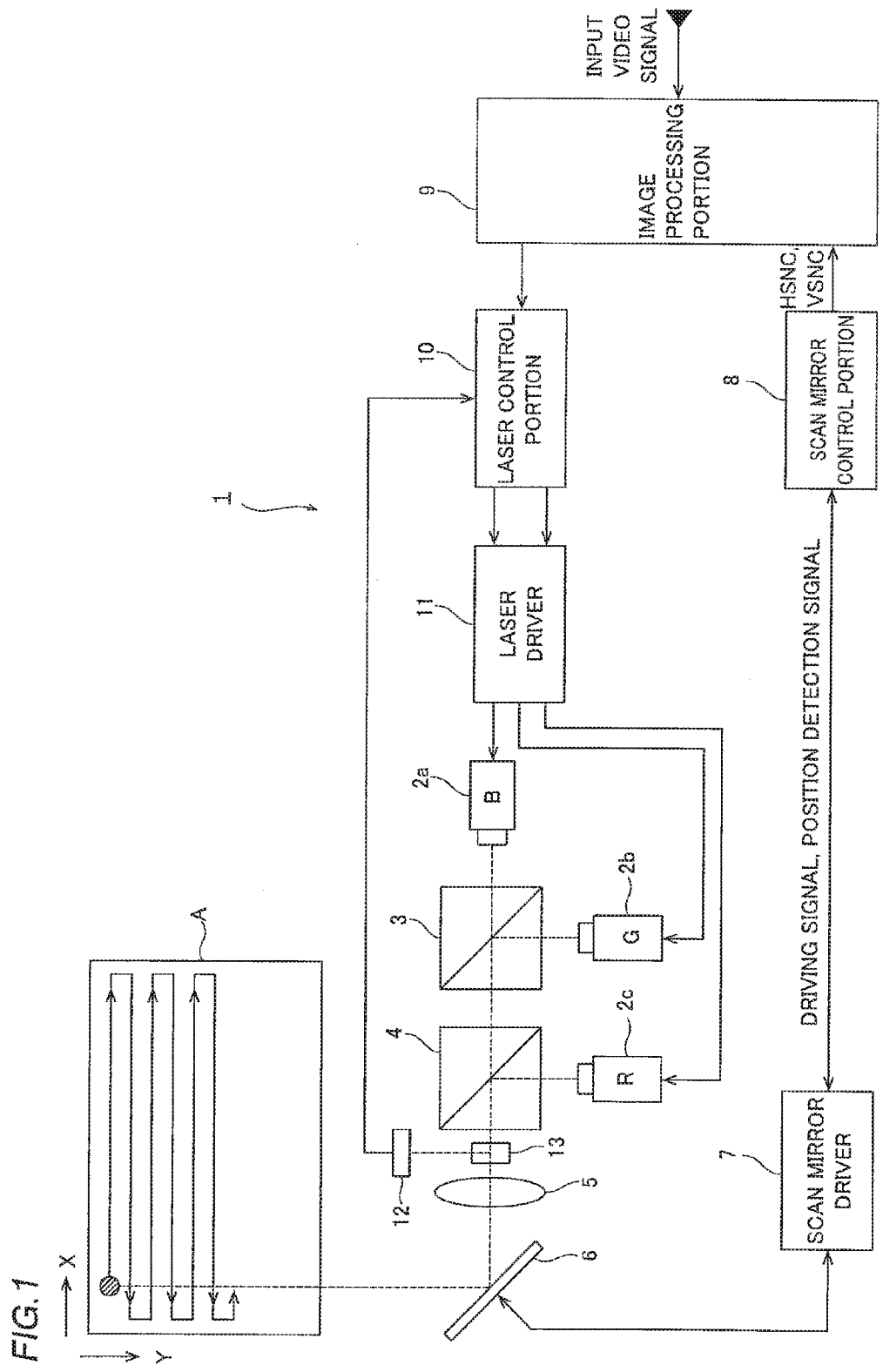
FIG. 1 illustrates the structure of a main section of an image display apparatus according to an embodiment of the present invention.

FIG. 1 illustrates an example of a laser projector 1, and this laser projector 1 is mainly constituted by laser beam sources 2a to 2c, various optical elements (dichroic mirrors 3 and 4 and a lens 5), a scan mirror 6, and various drive/control units (a scan mirror driver 7, a scan mirror control portion 8, an image processing portion 9, a laser control portion 10, and a laser driver 11). The laser projector 1 synthesizes laser beams of color components of red, blue, and green, and thereafter projects the synthesized beam on a projection surface A, such as a screen or a wall, thereby displaying a color image according to an input video signal on the projection surface A. The laser projector 1 is an example of the "image display apparatus" in the present invention.

The laser beam sources 2a to 2c are laser diodes (LDs) outputting laser beams of different color components and are driven independently of each other by the driving current individually supplied from the laser driver 11 to output laser beams of single color components. Thus, the laser beams of the single color components of specified wavelengths are emitted. In other words, a laser beam of a blue color component (B) is emitted from the laser beam source 2a, a laser beam of a green color component (G) is emitted from the laser beam source 2b, and a laser beam of a red color component (R) is emitted from the laser beam source 2c. The laser beam source 2a is an example of the "laser beam source portion" or the "blue laser beam source" in the present invention. The laser beam source 2b is an example of the "laser beam source portion" or the "green laser beam source" in the present invention. The laser beam source 2c is an example of the "laser beam source portion" or the "red laser beam source" in the present invention.

The dichroic mirrors 3 and 4 transmit only laser beams of specified wavelengths and reflect others thereby synthesizing the laser beams of the color components of R, G, and B emitted from the laser beam sources 2a to 2c. Specifically, the laser beams of the blue color component and the green color component emitted from the laser beam sources 2a and 2b are synthesized in the dichroic mirror 3 on the upstream of an optical path, and thereafter are emitted to the dichroic mirror on the downstream of the optical path. This emitted synthesized beam and the laser beam of the red color component emitted from the laser beam source 2c are further synthesized in the dichroic mirror 4, and are emitted as a targeting final color-synthesized beam. The dichroic mirrors 3 and 4 include optical portions synthesizing the laser beams of the color components of R, G, and B, and the color-synthesized beam obtained by this synthesis is incident on the scan mirror 6 through the lens 5. The dichroic mirrors 3 and 4 are examples of the "synthesized beam generation portion" in the present invention.

According to this embodiment, as the scan mirror 6, a MEMS (micro electro mechanical system) scan mirror advantageous for downsizing, low power consumption, speeding up of processing, etc. is employed. The scan mirror 6 is displaced in a horizontal direction (direction X) and a vertical direction (direction Y) by the scan mirror driver 7 into which a driving signal is input from the scan mirror control portion 8, reflects the color beam incident on the scan mirror 6 according to the deflection angle of the scan mirror 6, and projects the same on the projection surface A. The scan mirror 6 is an example of the "scan portion" in the present invention.

The image processing portion 9 transmits video data to the laser control portion 10 at prescribed time intervals on the basis of a video signal input from an external device such as a personal computer, whereby the laser control portion 10 obtains pixel information at a prescribed scan position. The laser control portion 10 controls the laser driver 11 with a driving current waveform signal in order to project an image including a plurality of pixels on a projection range on the basis of the pixel information. Furthermore, the laser control portion 10 controls the outputs of the laser beam sources 2a to 2c according to the light quantities of the branched laser beams of the color components of R, G, and B detected by a detector 12. The laser control portion 10 is an example of the "control portion" in the present invention.

According to this embodiment, the laser control portion 10 controls the outputs of the laser beam sources 2a to 2c through the laser driver 11 in order to create a white balance on the basis of the detection result of the detector 12, as described later. Furthermore, according to this embodiment, the laser control portion 10 drives all the laser beam sources 2a to 2c to allow a laser beam source for any one of the three color components to output a laser beam during image display with the synthesized beam of the three color components and executes a mode in which the outputs of laser beams from laser beam sources for the remaining color components are stopped every frame or every several frames of a projection image, as described later. In other words, a laser beam of a single color component of R, G, and B is output for a very short period of time during image display with the synthesized beam, and the laser beam of the single color component is output with respect to each of R, G, and B. Thus, the laser control portion 10 is configured to switch between a first mode in which an image is continuously displayed without detection of the light quantity and a second mode in which the laser beam is output from the laser beam source 2a, 2b, or 2c for any one of the color components during image display with the synthesized beam and the light quantity of the laser beam is detected. As the second mode, an existing mode employed to correct the outputs of the laser beam source portions during image display may be utilized.

The laser driver 11 drives the laser beam sources 2a to 2c to allow the laser beam sources 2a to 2c to emit the laser beams on the basis of the aforementioned control performed by the laser control portion 10. The laser beam sources 2a to 2c emit the laser beams when current greater than or equal to the vibration threshold current is supplied from the laser driver 11 and output the laser beams having larger outputs (light quantities) as the value of the supplied current increases. Furthermore, the laser beam sources 2a to 2c stop outputting the laser beams when current less than the vibration threshold current is supplied. According to this embodiment, as the laser beam sources 2a to 2c, the laser diodes (LDs) are employed.

According to this embodiment, a branching unit 13 is provided in the optical path of the color synthesized beam between the dichroic mirror 4 and the lens 5. In other words, the branching unit 13 is arranged between the dichroic mirror 4 and the scan mirror 6 in the optical path of the synthesized beam. The branching unit 13 branches an incident beam into a beam guided to the scan mirror 6 and a beam guided to the detector 12 with a dielectric multi-layer 15 having prescribed reflectance characteristics. This branched beam is applied to the detector 12, and a signal indicating the light quantity detected by the detector 12 is input into the laser control portion 10.

Figure 2:
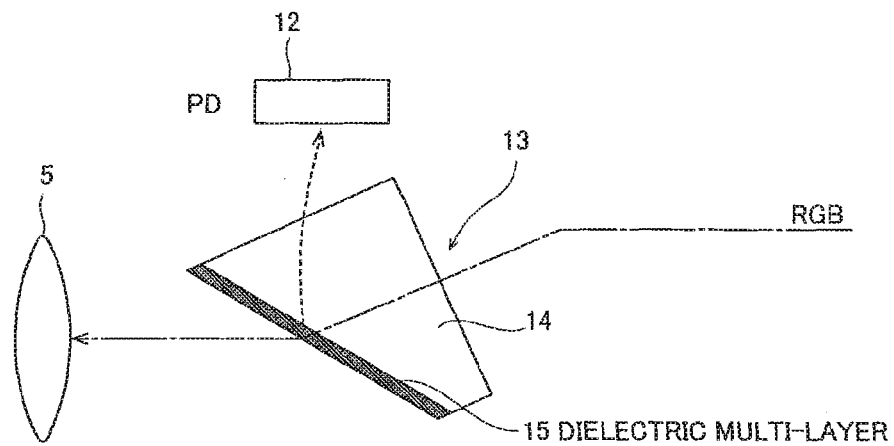
FIG. 2 illustrates a branching unit according to the embodiment of the present invention.

The branching unit 13 according to this embodiment is a prism 14 formed with a reflective film having prescribed reflectance characteristics on one end surface, as shown in FIG. 2, and the incident beam is reflected by this reflective film with a prescribed reflectance and is incident on the detector 12. The transmitted beam is incident on the scan mirror 6 through the lens 5. According to this embodiment, as this reflective film, the dielectric multi-layer 15 is employed. According to this embodiment, the beam reflected by the branching unit 13 is incident on the detector 12, but the branching unit 13 may be allowed to have prescribed transmittance characteristics, the beam transmitted through the branching unit 13 may be incident on the detector 12, and the reflected beam may be incident on the scan mirror 6.

According to this embodiment, the branching unit is configured to have a reflectance with increase/decrease characteristics opposite to the increase/decrease characteristics of the outputs of the laser beams in increasing or decreasing the outputs of the laser beams of the color components of R, G, and B according to changes of the wavelengths of the laser beams of the color components of R, G, and B in order to maintain the white balance of the synthesized beam.

Figure 3:
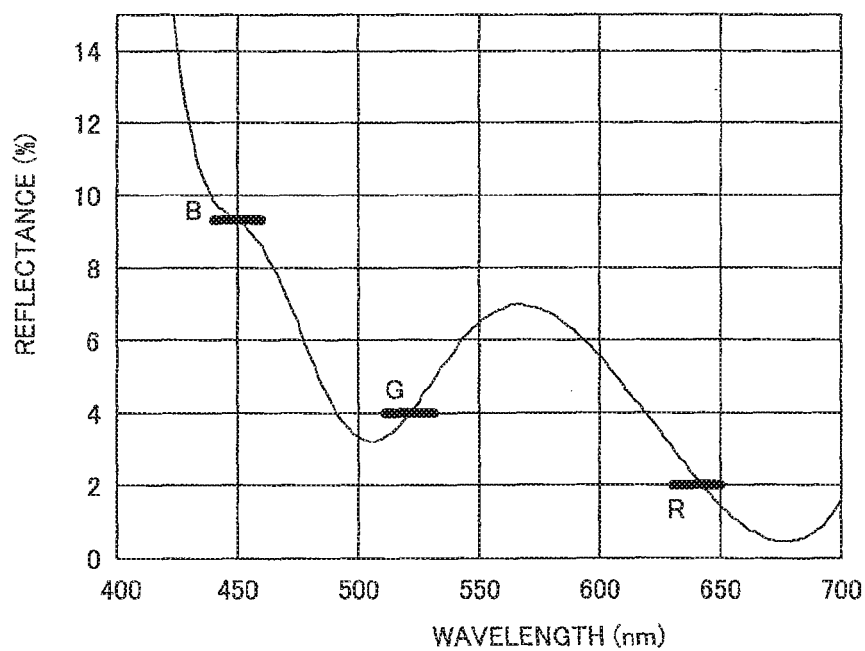
FIG. 3 illustrates a relationship between a wavelength and the reflectance of a reflective film.

Specifically, the branching unit 13 is so configured that the reflectance thereof is changed in response to a change of the wavelength of the laser beam. As shown in FIG. 3, the branching unit 13 is so configured that the reflectance thereof is decreased when the wavelength of the laser beam in the range of blue and the wavelength of the laser beam in the range of red are increased and the reflectance thereof is increased when the wavelength of the laser beam in the range of green is increased. Furthermore, the branching unit 13 is so configured that the reflectance (about 10%) for the laser beam of the blue color component is highest, the reflectance (about 2%) for the laser beam of the red color component is lowest, and the reflectance (about 4%) for the laser beam of the green color component is between the reflectance for the laser beam of the blue color component and the reflectance for the laser beam of the red color component.

According to this embodiment, a mode in which the laser control portion 10 allows the laser beam sources 2a to 2c to output the laser beams of the single color components of R, G, and B, as described above, at intervals of one or several frames during projection display of a color image with the synthesized beam of R, G, and B is employed, and the branching unit 13 provided in the optical path of the synthesized beam detects the light quantities of the laser beams of the single color components of R, G, and B at the timing when these laser beams of the single color components are output. Therefore, the laser control portion 10 controls increase and decrease of the outputs of the laser beam sources 2a to 2c in order to create the white balance on the basis of the light quantities of R, G, and B detected by the detector 12 according to the aforementioned timing.

Specifically, the laser control portion 10 is configured to decrease the output of a laser beam source for a color component whose detected light quantity is increased of the laser beam sources 2a to 2c and increase the output of a laser beam source for a color component whose detected light quantity is decreased of the laser beam sources 2a to 2c according to the light quantities of the branched laser beams of the color components of R, G, and B detected by the detector 12.

For example, the laser control portion 10 is configured to increase the outputs of the laser beam source 2a outputting the laser beam of the blue color component and the laser beam source 2c outputting the laser beam of the red color component and decrease the output of the laser beam source 2b outputting the laser beam of the green color component when the wavelengths of the laser beams of the color components of R, G, and B output from the laser beam sources are increased due to increase in temperature.

The laser control portion 10 is configured to allow the laser beam source 2a, 2b, or 2c for any one of the color components of R, G, and B to output the laser beam during image display with the synthesized beam. Specifically, the laser control portion 10 is configured to allow the laser beam sources 2a to 2c one by one to sequentially output the laser beams at intervals of a prescribed number of frames (at the intervals of one or several frames, for example) during image display with the synthesized beam and control the outputs of the laser beam sources 2a to 2c according to the light quantities of the branched laser beams of the color components of R, G, and B detected by the detector 12.

According to this embodiment, the branching unit 13 is provided in the optical path of the synthesized beam, so that the branching unit 13 is shared for the color components of R, G, and B, but the branching unit 13 and the detector 12 may be provided in the optical path of each of the laser beams of the single color components of R, G, and B. In this case, the aforementioned mode is not required.

When the wavelengths of the laser beams of the single color components of the R, G, and B output from the laser beam sources 2a to 2c change due to a temperature change in a state where the laser beams of the single color components of R, G, and B have a prescribed output ratio to create the white balance, the white balance is lost unless the prescribed output ratio is achieved with these changed wavelengths. The reflectance characteristics of the dielectric multi-layer 15 are utilized to control the outputs of the laser beam sources in order to maintain the white balance in this manner.

As the wavelength of the laser beam of the blue color component (B) changes in the range of about 450 nm due to a temperature change, for example, the wavelengths of the laser beams of the color components of R, G, and B change in certain ranges in response to a possible temperature change. The dielectric multi-layer 15 has such characteristics that the reflectance changes in the wavelength change ranges of the laser beams of the color components of R, G, and B due to a temperature change in an example shown in FIG. 3, and these reflectance characteristics are opposite to such characteristics that the outputs of the laser beams of the color components of R, G, and B are increased or decreased with respect to changes of the wavelengths of the laser beams of the color components of R, G, and B, as described above.

The example shown in FIG. 3 exhibits such reflectance characteristics that as to the laser beam of the blue color component (B), the reflectance is decreased after the wavelength passes through about 450 nm, as to the laser beam of the green color component (G), the reflectance is increased after the wavelength passes through about 510 nm, and as to the laser beam of the red color component (R), the reflectance is decreased when the wavelength is increased. The details according to this embodiment are shown in FIG. 5.

Output control of the laser beam sources 2a to 2c utilizing the reflectance characteristics of the dielectric multi-layer 15 is now described. FIG. 4 illustrates examples of the wavelengths and outputs of the laser beams of R, G, and B according to the temperature. View (a) of FIG. 4 illustrates characteristics in which the white balance (white display) is created at the temperature of 25° C., view (b) of FIG. 4 illustrates characteristics in which the temperature changes to 50° C. and the white balance is lost, and view (c) of FIG. 4 illustrates characteristics for maintaining the white balance and brightness at the temperature of 50° C.

Figures 4, 5:
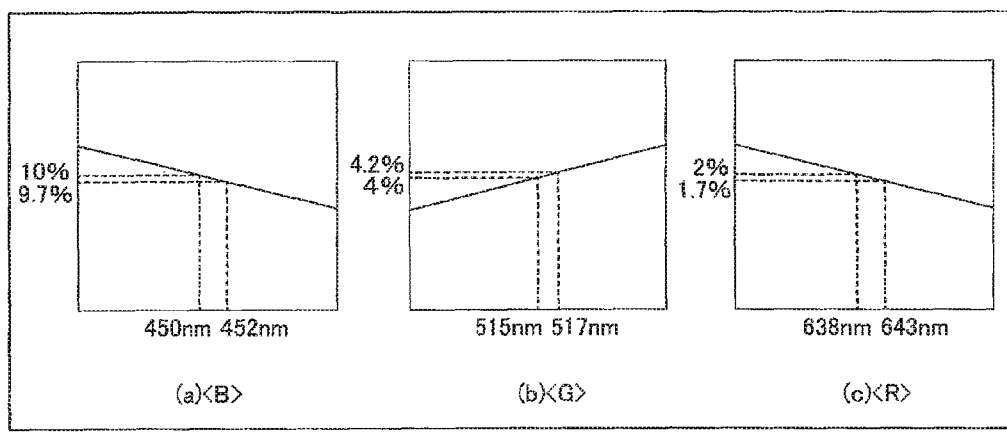
FIG. 4 illustrates relationships between the wavelengths and outputs of laser beam sources for maintaining a white balance according to the embodiment of the present invention; view (a) illustrates characteristics at a temperature of 25° C.; view (b) illustrates characteristics at a temperature of 50° C.; view (c) illustrates characteristics at a temperature of 50° C.
FIG. 5 illustrates the reflectance characteristics of the branching unit according to the embodiment of the present invention; view (a) illustrates characteristics with respect to a blue laser beam; view (b) illustrates characteristics with respect to a green laser beam; view (c) illustrates characteristics with respect to a red laser beam.

As shown in view (a) of FIG. 4, at the temperature of 25° C., the laser beam of the red color component (R) output from the laser beam source 2c has a wavelength of 638 nm and an output of P mW, the laser beam of the green color component (G) output from the laser beam source 2b has a wavelength of 515 nm and an output of 0.76 P mW, and the laser beam of the blue color component (B) output from the laser beam source 2a has a wavelength of 450 nm and an output of 0.55 P mW. By these relationships between the wavelengths and the outputs, the white balance is created at 12.0 lm. The outputs of the laser beams from the laser beam sources are represented based on the output P mW of the red color component (R) at the temperature of 25° C.

When the temperature changes from this state to 50° C., the laser beam of the red color component (R) output from the laser beam source 2c has a wavelength of 643 nm and an output of P mW, the laser beam of the green color component (G) output from the laser beam source 2b has a wavelength of 517 nm and an output of 0.76 P mW, and the laser beam of the blue color component (B) output from the laser beam source 2a has a wavelength of 452 nm and an output of 0.55 P mW, as shown in view (b) of FIG. 4. The wavelengths and outputs vary, and the white balance is lost at 11.9 lm.

In order to maintain the white balance and brightness at the temperature of 50° C., the laser beam of the red color component (R) output from the laser beam source 2c must have a wavelength of 643 nm and an output of 1.21 P mW, the laser beam of the green color component (G) output from the laser beam source 2b must have a wavelength of 517 nm and an output of 0.72 P mW, and the laser beam of the blue color component (B) output from the laser beam source 2a must have a wavelength of 452 nm and an output of 0.56 P mW, as shown in view (c) of FIG. 4. In other words, unless the outputs of the laser beam sources 2a to 2c are controlled according to a temperature change, the proper outputs of the laser beam sources according to a wavelength change cannot be obtained, and hence the white balance cannot be maintained, as shown in view (b) of FIG. 4.

These relationships between the wavelengths of the laser beams of the color components of R, G, and B and the outputs of the laser beams of the color components for creating the white balance can be obtained by an experiment. These relationships can be also obtained from the following publicly known calculation.

An example of calculating an RGB ratio (an output ratio) for creating the white balance, setting the wavelengths of R, G, and B to 637 nm, 510 nm, and 445 nm, respectively and representing the ratio as a:b:c is now described. As shown in FIG. 6, tristimulus values (X, Y, Z) are first obtained from a color-matching function (according to this embodiment, CIE1931 (Commission Internationale de l'Eclairage, 1931)) and the spectral sensitivities of the laser beam sources (RGB ratio). According to this embodiment, the tristimulus values are obtained as $X=0.34225*a+0.0093*b+0.506160*c$, $Y=0.03050*a+0.5030*b+0.20200*c$, and $Z=1.75950*a+0.1582*b+0.000029*c$. Then, the ratio of these tristimulus values (X, Y, Z) is quantified as chromaticity x and y. According to this embodiment, the ratio of these tristimulus values (X, Y, Z) is quantified as $x=X/(X+Y+Z)$ and $y=Y/(X+Y+Z)$. Then, the RGB ratio is so adjusted that this chromaticity (x, y) becomes white (x=0.33 and y=0.33, for example) in a chromaticity diagram shown in FIG. 7 (in FIG. 7, R represents a red region, G represents a green region, and B represents a blue region). According to this embodiment, the white balance is created when the RGB ratio is 3.4:2.7:1.0.

In order to maintain the white balance even when the temperature changes from 25° C. to 50° C. as described above, the laser control portion 10 performs control of increasing the output of the laser beam of the red color component (R) from P mW to 1.21 P mW, decreasing the output of the laser beam of the green color component (G) from 0.76 P mW to 0.72 P mW, and increasing the output of the laser beam of the blue color component (B) from 0.55 P mW to 0.56 P mW on the laser beam sources 2a to 2c.

This output control of the laser beam sources 2a to 2c performed by the laser control portion 10 is performed according to the light quantities of the color components of R, G, and B detected by the detector 12, and the laser control portion 10 performs control of decreasing the outputs of the laser beam sources when the detected light quantities are large and increasing the outputs of the laser beam sources when the detected light quantities are small. The branching unit 13 (the dielectric multi-layer 15) has reflectance characteristics opposite to the characteristic of increasing or decreasing the outputs by the laser control portion 10 in control of increasing or decreasing the outputs correspondingly to a wavelength change in order to create the white balance, and hence the branching unit 13 reflects beams of the corresponding light quantities and allows the beams to be incident on the detector 12 in order to control the outputs such that the white balance is created with the changed wavelengths.

In the examples shown in FIG. 4, when the temperature changes from 25° C. to 50° C., the wavelength of the laser beam of the blue color component (B) changes from 450 nm to 452 nm, the wavelength of the laser beam of the green color component (G) changes from 515 nm to 517 nm, and the wavelength of the laser beam of the red color component (R) changes from 638 nm to 643 nm. With respect to these changes of the wavelengths, the dielectric multi-layer 15 exhibits the reflectance characteristics shown in FIG. 5, and hence the aforementioned output control based on the detected light quantities of the reflected beams is properly performed by the laser control portion 10 while the white balance is maintained.

In other words, as shown in view (a) of FIG. 5, with respect to the laser beam of the blue color component (B) whose wavelength changes from 450 nm to 452 nm, the reflectance of the dielectric multi-layer 15 is decreased from 10% to 9.7%. Thus, the light quantity of this reflected beam detected by the detector 12 is decreased, so that the laser control portion 10 performs control of increasing the output of the laser beam source 2a for the blue color component (B) from 0.55 P mW to 0.56 P mW.

Furthermore, as shown in view (b) of FIG. 5, with respect to the laser beam of the green color component (G) whose wavelength changes from 515 nm to 517 nm, the reflectance of the dielectric multi-layer 15 is increased from 4% to 4.2%. Thus, the light quantity of this reflected beam detected by the detector 12 is increased, so that the laser control portion 10 performs control of decreasing the output of the laser beam source 2b for the green color component (G) from 0.76 P mW to 0.72 P mW.

In addition, as shown in view (a) of FIG. 5, with respect to the laser beam of the red color component (R) whose wavelength changes from 638 nm to 643 nm, the reflectance of the dielectric multi-layer 15 is decreased from 2% to 1.7%. Thus, the light quantity of this reflected beam detected by the detector 12 is decreased, so that the laser control portion 10 performs control of increasing the output of the laser beam source 2c for the red color component (R) from P mW to 1.21 P mW. Therefore, the white balance of the synthesized beam of R, G, and B is maintained even at the temperature of 50° C.

According to this embodiment, as hereinabove described, the laser projector 1 is provided with the branching unit 13 having the reflectance with the increase/decrease characteristics opposite to the increase/decrease characteristics of the outputs of the laser beams in increasing or decreasing the outputs of the laser beams of the color components of R, G, and B according to changes of the wavelengths of the laser beams of the color components of R, G, and B in order to maintain the white balance of the synthesized beam, whereby even when the wavelengths of the laser beams change, the outputs of the laser beam sources 2a to 2c are controlled according to the light quantities of the laser beams of the color components of R, G, and B branched by the branching unit 13 and detected by the detector 12, so that the white balance can be maintained.

According to this embodiment, as hereinabove described, the laser control portion 10 is configured to decrease the outputs of the laser beam sources 2a to 2c for the color components whose detected light quantities are increased and increase the outputs of the laser beam sources 2a to 2c for the color components whose detected light quantities are decreased according to the light quantities of the branched laser beams of the color components of R, G, and B detected by the detector 12. Thus, the outputs of the laser beam sources 2a to 2c are adjusted in such directions as to cancel the changes of the detected light quantities, whereby the white balance can be easily maintained.

According to this embodiment, as hereinabove described, the laser control portion 10 is configured to increase the outputs of the laser beam source 2a outputting the laser beam of the blue color component and the laser beam source 2c outputting the laser beam of the red color component and decrease the output of the laser beam source 2b outputting the laser beam of the green color component when the wavelengths of the laser beams of the color components of R, G, and B output from the laser beam sources are increased due to a temperature rise. Thus, even when the wavelengths of the laser beams of the color components of R, G, and B output from the laser beam sources 2a to 2c are increased due to a temperature rise, the white balance can be easily maintained by increasing the outputs of the laser beam source 2a and the laser beam source 2c and decreasing the output of the laser beam source 2b.

According to this embodiment, as hereinabove described, the branching unit 13 is so configured that the reflectance thereof changes according to the changes of the wavelengths of the laser beams. Thus, the changes of the wavelengths of the laser beams can be easily detected by the changes of the light quantities of the laser beams of the color components of R, G, and B branched by the branching unit 13.

According to this embodiment, as hereinabove described, the branching unit 13 is so configured that the reflectance thereof decreases when the wavelengths of the laser beam of the blue color component and the laser beam of the red color component are increased and increases when the wavelength of the laser beam of the green color component is increased. Thus, the changes of the wavelengths of the laser beams of the blue, red, and green color components are easily detected and the outputs of the laser beam sources for the blue, red, and green color components are adjusted by the control portion, whereby the white balance can be easily maintained.

According to this embodiment, as hereinabove described, the branching unit 13 is so configured that the reflectance thereof for the laser beam of the blue color component is highest, the reflectance thereof for the laser beam of the red color component is lowest, and the reflectance thereof for the laser beam of the green color component is between the reflectance for the laser beam of the blue color component and the reflectance for the laser beam of the red color component. Thus, the light quantity of the laser beam of the blue color component whose wavelength is short and for which the detection sensitivity is low, being incident on the detector 12 is increased, and the light quantity of the laser beam of the red color component whose wavelength is long and for which the detection sensitivity is high, being incident on the detector 12 is decreased. Therefore, the detector 12 can reliably detect the laser beams of the red color component, the green color component, and the blue color component without increasing the range of the detection sensitivity of the detector 12 for the laser beams.

According to this embodiment, as hereinabove described, the branching unit 13 is configured to include the prism 14 formed with the dielectric multi-layer 15 having the reflectance with the increase/decrease characteristics opposite to the increase/decrease characteristics of the outputs of the laser beams. Thus, due to the dielectric multi-layer 15, the branching unit 13 having the reflectance with the increase/decrease characteristics opposite to the increase/decrease characteristics of the outputs of the laser beams in increasing or decreasing the outputs of the laser beams of the color components of R, G, and B according to the changes of the wavelengths of the laser beams of the color components of R, G, and B in order to maintain the prescribed color state of the synthesized beam can be easily provided. Furthermore, the branching unit 13 includes the prism 14 formed with the dielectric multi-layer 15, whereby the branching unit 13 can be employed with the function of the prism 14 in addition to a function of branching the beam.

According to this embodiment, as hereinabove described, the branching unit 13 is provided in the optical path of the synthesized beam, and the laser control portion 10 is configured to allow the laser beam source 2a, 2b, or 2c for any one of the color components to output the laser beam during image display with the synthesized beam and control the output of the corresponding laser beam source 2a, 2b, or 2c according to the light quantity of the branched laser beam of the single color component detected by the detector 12. Thus, the branching unit 13 and the detector 12 can be shared for the color components of R, G, and B, and hence the number of components can be reduced.

According to this embodiment, as hereinabove described, the laser control portion 10 is configured to allow a plurality of laser beam sources 2a to 2c one by one to sequentially output the laser beams during image display with the synthesized beam and control the outputs of the laser beam sources 2a to 2c according to the light quantities of the branched laser beams of the color components of R, G, and B detected by the detector 12. Thus, the laser beams of the color components of R, G, and B can be detected individually, and hence the changes of the light quantities of the laser beams of the color components of R, G, and B can be more accurately detected.

According to this embodiment, as hereinabove described, the laser control portion 10 is configured to allow the laser beam source 2a, 2b, or 2c for any one of the color components to output the laser beam for detecting the light quantity at the intervals of the prescribed number of frames during image display with the synthesized beam and control the output of the corresponding laser beam source 2a, 2b, or 2c according to the light quantity of the branched laser beam of the single color component detected by the detector 12. Thus, even when the wavelength of the laser beam changes during image display, the output of the corresponding laser beam source 2a, 2b, or 2c can be adjusted according to the change of the light quantity detected by the detector 12, and hence the white balance state during image display can be easily maintained.

According to this embodiment, as hereinabove described, the laser control portion 10 is configured to switch between the first mode in which an image is continuously displayed without detection of the light quantity and the second mode in which the laser beam is output from the laser beam source 2a, 2b, or 2c for any one of the color components during image display with the synthesized beam and the light quantity of the laser beam is detected. Thus, the white balance state during image display can be easily maintained by the second mode while the image is continuously smoothly displayed without detection of the light quantity by the first mode.

According to this embodiment, as hereinabove described, the branching unit 13 is arranged between the dichroic mirror 4 and the scan mirror 6 in the optical path of the synthesized beam. Thus, the branching unit 13 can be arranged at a position on which the laser beams of the color components of R, G, and B are focused, and hence increase in the size of the branching unit 13 can be inhibited.

The embodiment disclosed this time must be considered as illustrative in all points and not restrictive. The range of the present invention is shown not by the above description of the embodiment but by the scope of claims for patent, and all modifications within the meaning and range equivalent to the scope of claims for patent are further included.

For example, while the present invention is applied to the laser projector in the aforementioned embodiment, the present invention is not restricted to this. The present invention may alternatively be applied to an image display apparatus other than the laser projector.

While the present invention is applied to the state where the white balance is created as the prescribed color state in the aforementioned embodiment, the present invention is not restricted to this. For example, the prescribed color state may alternatively be settable according to design, user's preference, or the like.

While the branching unit includes the prism formed with the dielectric multi-layer in the aforementioned embodiment, the present invention is not restricted to this. According to the present invention, a branching unit other than the dielectric multi-layer may alternatively be employed.

While the branching unit is provided in the optical path of the synthesized beam in the aforementioned embodiment, the present invention is not restricted to this. According to the present invention, a branching unit may alternatively be provided for each of the laser beam source portions for the color components and detect the light quantity of the laser beam of each color component, for example.

While the laser beam source portions include the laser beam source for the red color component, the laser beam source for the green color component, and the laser beam source for the blue color component in the aforementioned embodiment, the present invention is not restricted to this. According to the present invention, the laser beam source portion may alternatively be configured to include laser beam sources for another color combination so far as a plurality of different color components are included.

What is claimed is:

1. An image display apparatus comprising:
   laser beam source portions outputting laser beams of a plurality of color components different from each other, respectively;
   a synthesized beam generation portion synthesizing the laser beams of the plurality of color components to generate a synthesized beam;
   a control portion controlling outputs of the laser beam source portions;
   a branching unit branching the laser beams of the color components; and
   a detection portion detecting light quantities of the laser beams of the color components branched by the branching unit, wherein
   the branching unit has a reflectance or transmittance with increase/decrease characteristics opposite to increase/decrease characteristics of outputs of the laser beams in increasing or decreasing the outputs of the laser beams of the color components according to changes of wavelengths of the laser beams of the color components, and
   the control portion is configured to control the outputs of the laser beam source portions according to light quantities of branched laser beams of the color components detected by the detection portion.

2. The image display apparatus according to claim 1, wherein
   the control portion is configured to decrease the outputs of the laser beam source portions for the color components whose detected light quantities are increased and increase the outputs of the laser beam source portions for the color components whose detected light quantities are decreased according to the light quantities of the branched laser beams of the color components detected by the detection portion.

3. The image display apparatus according to claim 1, wherein
   the control portion is configured to increase outputs of a blue laser beam source outputting a laser beam of a blue color component and a red laser beam source outputting a laser beam of a red color component and decrease an output of a green laser beam source outputting a laser beam of a green color component when the wavelengths of the laser beams of the color components output from the laser beam source portions are increased due to a temperature rise.

4. The image display apparatus according to claim 1, wherein
   the branching unit is so configured that the reflectance or transmittance thereof changes according to the changes of the wavelengths of the laser beams.

5. The image display apparatus according to claim 4, wherein
   the branching unit is so configured that the reflectance or transmittance thereof decreases when wavelengths of a laser beam of a blue color component and a laser beam of a red color component are increased and increases when a wavelength of a laser beam of a green color component is increased.

6. The image display apparatus according to claim 1, wherein
   the branching unit is so configured that the reflectance or transmittance thereof for a laser beam of a blue color component is highest, the reflectance or transmittance thereof for a laser beam of a red color component is lowest, and the reflectance or transmittance thereof for a laser beam of a green color component is between the reflectance or transmittance thereof for the laser beam of the blue color component and the reflectance or transmittance thereof for the laser beam of the red color component.

7. The image display apparatus according to claim 1, wherein
   the prescribed color state comprises a state where a white balance of the synthesized beam is created.

8. The image display apparatus according to claim 1, wherein
   the branching unit includes a prism formed with a dielectric multi-layer having a reflectance or transmittance with increase/decrease characteristics opposite to the increase/decrease characteristics of the outputs of the laser beams.

9. The image display apparatus according to claim 1, wherein
   the branching unit is provided in an optical path of the synthesized beam, and
   the control portion is configured to allow a laser beam source portion for any one of the color components to output a laser beam during image display with the synthesized beam and control an output of the laser beam source portion according to a light quantity of a branched laser beam of a single color component detected by the detection portion.

10. The image display apparatus according to claim 9, wherein
    the control portion is configured to allow the laser beam source portions one by one to sequentially output the laser beams during the image display with the synthesized beam and control the outputs of the laser beam source portions according to the light quantities of the branched laser beams of the color components detected by the detection portion.

11. The image display apparatus according to claim 9, wherein
    the control portion is configured to allow the laser beam source portion for any one of the color components to output the laser beam for detecting the light quantity at an interval of a prescribed number of frames during the image display with the synthesized beam and control the output of the laser beam source portion according to the light quantity of the branched laser beam of the single color component detected by the detection portion.

12. The image display apparatus according to claim 9, wherein
    the control portion is configured to switch between a first mode in which an image is continuously displayed without detection of the light quantity and a second mode in which the laser beam is output from the laser beam source portion for any one of the color components during the image display with the synthesized beam and the light quantity of the laser beam is detected.

13. The image display apparatus according to claim 1, further comprising a scan portion scanning the synthesized beam, wherein
    the branching unit is arranged between the synthesized beam generation portion and the scan portion in an optical path of the synthesized beam.

14. The image display apparatus according to claim 13, wherein
    the scan portion comprises a MEMS scan mirror.

15. The image display apparatus according to claim 1, wherein
the synthesized beam generation portion includes a dichroic mirror.

16. An optical component having a reflectance or transmittance with increase/decrease characteristics opposite to increase/decrease characteristics of outputs of laser beams in increasing or decreasing the outputs of the laser beams of a plurality of color components according to changes of wavelengths of the laser beams of the color components,
the optical component provided in an image display apparatus comprising a detection portion detecting light quantities of the laser beams and a control portion controlling outputs of laser beam source portions outputting the laser beams of the plurality of color components different from each other, respectively, according to detection results of the detection portion, including a branching unit branching the laser beams of the color components and guiding the laser beams to the detection portion.

17. The optical component according to claim 16, wherein the control portion is configured to decrease the outputs of the laser beam source portions for the color components whose detected light quantities are increased and increase the outputs of the laser beam source portions for the color components whose detected light quantities are decreased according to light quantities of branched laser beams of the color components detected by the detection portion.

18. The optical component according to claim 16, wherein the branching unit is so configured that a reflectance or transmittance thereof changes according to the changes of the wavelengths of the laser beams.

19. The optical component according to claim 18, wherein the branching unit is so configured that the reflectance or transmittance thereof decreases when wavelengths of a laser beam of a blue color component and a laser beam of a red color component are increased and increases when a wavelength of a laser beam of a green color component is increased.

20. The optical component according to claim 16, wherein the branching unit is so configured that the reflectance or transmittance thereof for a laser beam of a blue color component is highest, the reflectance or transmittance thereof for a laser beam of a red color component is lowest, and the reflectance or transmittance thereof for a laser beam of a green color component is between the reflectance or transmittance thereof for the laser beam of the blue color component and the reflectance or transmittance thereof for the laser beam of the red color component.

* * * * *